(12) United States Patent
Ishii et al.

(10) Patent No.: US 8,411,999 B2
(45) Date of Patent: Apr. 2, 2013

(54) CALIBRATING APPARATUS

(75) Inventors: Yohei Ishii, Osaka (JP); Keisuke Asari, Katano (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 257 days.

(21) Appl. No.: 13/013,766

(22) Filed: Jan. 25, 2011

(65) Prior Publication Data

US 2011/0181733 A1    Jul. 28, 2011

(30) Foreign Application Priority Data

Jan. 26, 2010   (JP) .................................. 2010-14423

(51) Int. Cl.
*G06K 9/32* (2006.01)

(52) U.S. Cl. ........ 382/293; 382/286; 382/291; 702/150; 702/155

(58) Field of Classification Search ............... 382/286, 382/287, 291, 293, 295; 702/150, 155, 156
See application file for complete search history.

(56) References Cited

U.S. PATENT DOCUMENTS

| | | | |
|---|---|---|---|
| 7,489,335 B2* | 2/2009 | Kochi et al. ................... | 348/180 |
| 7,526,131 B2* | 4/2009 | Weber ........................... | 382/199 |
| 7,583,815 B2* | 9/2009 | Zhang et al. ................... | 382/103 |
| 7,724,379 B2* | 5/2010 | Kawasaki et al. ............. | 356/603 |
| 7,974,461 B2* | 7/2011 | England et al. ............... | 382/154 |

FOREIGN PATENT DOCUMENTS

| | | |
|---|---|---|
| JP | 2006-148745 A | 6/2006 |
| JP | 2009-110152 A | 5/2009 |
| JP | 2009-210331 A | 9/2009 |

\* cited by examiner

*Primary Examiner* — Yosef Kassa
(74) *Attorney, Agent, or Firm* — Novak Druce Connolly Bove + Quigg LLP

(57) ABSTRACT

A calibrating apparatus includes a first reproducer which reproduces a reference image representing a state in which a plane is overlooked, along an X axis and a Y axis orthogonal to each other. A second reproducer reproduces a scene image outputted from a camera that captures the plane, along a U axis and a V axis orthogonal to each other. An acceptor accepts a designating manipulation of designating a first area of an X-Y coordinate system, in association with a reproducing process of the first reproducer. A first calculator calculates a second area of a U-V coordinate system corresponding to the first area designated by the designating manipulation, by referring to a calibration parameter indicating a corresponding relationship between the X-Y coordinate system and the U-V coordinate system. A definer defines the second area calculated by the first calculator, in association with a reproducing process of the second reproducer.

8 Claims, 18 Drawing Sheets

FIG.7

| 14r1 | X-Y COORDINATES | U-V COORDINATES |
|---|---|---|
| 1 | (X_1, Y_1) | (U_1, V_1) |
| 2 | (X_2, Y_2) | (U_2, V_2) |
| 3 | (X_3, Y_3) | (U_3, V_3) |
| 4 | (X_4, Y_4) | (U_4, V_4) |

14r2

| K | L | X-Y COORDINATES | U-V COORDINATES |
|---|---|---|---|
| 1 | 1 | | |
| | 2 | | |
| | 3 | | |
| | 4 | | |
| 2 | 1 | | |
| | 2 | | |
| | 3 | | |
| | 4 | | |
| 3 | 1 | | |
| | 2 | | |
| | 3 | | |
| | 4 | | |
| ⋮ | ⋮ | ⋮ | ⋮ |

(A) MAP IMAGE (B) CAMERA IMAGE (A) MAP IMAGE (B) CAMERA IMAGE (A) MAP IMAGE (B) CAMERA IMAGE (A) MAP IMAGE (B) CAMERA IMAGE

US 8,411,999 B2

CALIBRATING APPARATUS

CROSS REFERENCE OF RELATED APPLICATION

The disclosure of Japanese Patent Application No. 2010-14423, which was filed on Jan. 26, 2010, is incorporated herein by reference.

BACKGROUND OF THE INVENTION

1. Field of the Invention

The present invention relates to a calibrating apparatus. More particularly, the present invention relates to a calibrating apparatus that transforms coordinates designated on a reference image representing a state in which a plane is outlined or overlooked into coordinates on a scene image outputted from a camera that captures the plane.

2. Description of the Related Art

According to one example of this type of apparatus, an actual space is expressed by three-dimensional world coordinates (x, y, z), and a map image resembling a plane having world coordinates (x, y, 0) is expressed by two-dimensional image coordinates ($\alpha$, $\beta$). Furthermore, the image coordinates ($\alpha$, $\beta$) are associated with the world coordinates (x, y, 0) by a scaler. When a position of an index arranged in the actual space is designated on the map image, the image coordinates ($\alpha$, $\beta$) indicating the designated position is transformed into the world coordinates (x, y, 0) by the scaler.

However, in above-described apparatus, it is not assumed that a desired area is set to the actual space, and thus, it is probable that a load imposed on such an area setting task increases.

SUMMARY OF THE INVENTION

A calibrating apparatus according to the present invention, comprises: a first reproducer which reproduces a reference image representing a state in which a plane is overlooked, along an X axis and a Y axis orthogonal to each other; a second reproducer which reproduces a scene image outputted from a camera that captures the plane, along a U axis and a V axis orthogonal to each other; an acceptor which accepts a designating manipulation of designating a first area of an X-Y coordinate system, in association with a reproducing process of the first reproducer; a first calculator which calculates a second area of a U-V coordinate system corresponding to the first area designated by the designating manipulation by referring to a calibration parameter indicating a corresponding relationship between the X-Y coordinate system and the U-V coordinate system; and a definer which defines the second area calculated by the first calculator, in association with a reproducing process of the second reproducer.

The above described features and advantages of the present invention will become more apparent from the following detailed description of the embodiment when taken in conjunction with the accompanying drawings.

BRIEF DESCRIPTION OF THE DRAWINGS

FIG. 7 is an illustrative view showing one example of a configuration of a register applied to the embodiment in FIG. 2;

DETAILED DESCRIPTION OF THE PREFERRED EMBODIMENTS

Figure 1:
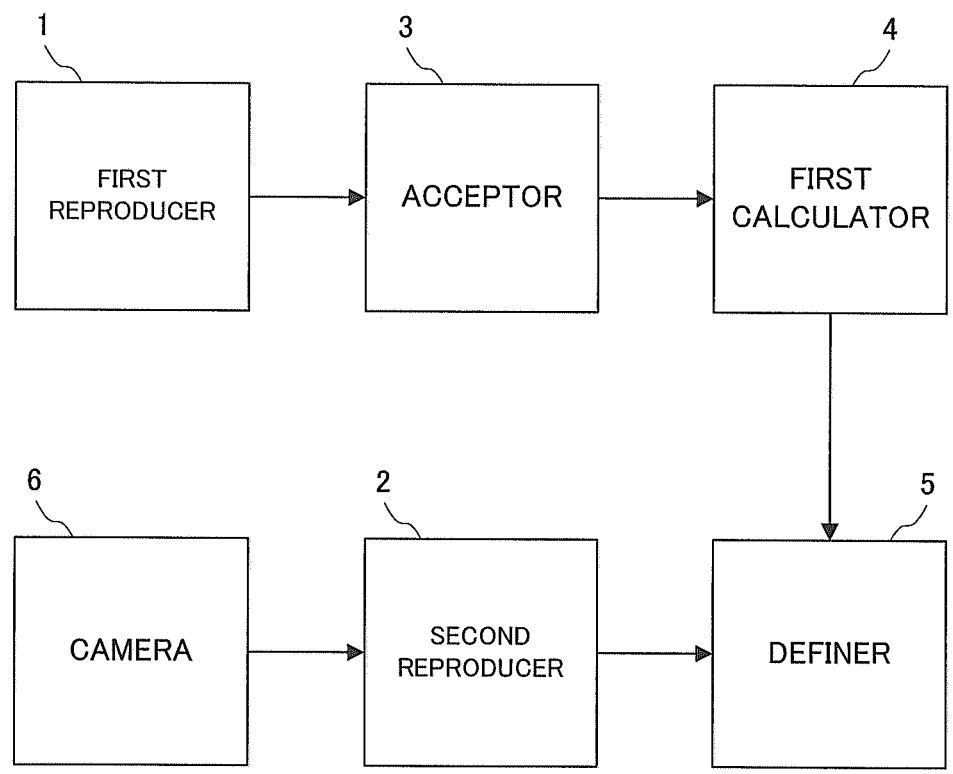
FIG. 1 is a block diagram showing a basic configuration of one embodiment of the present invention.

With reference to FIG. 1, a calibrating apparatus of one embodiment of the present invention is basically configured as follows: A first reproducer 1 reproduces a reference image representing a state in which a plane is overlooked, along an X axis and a Y axis orthogonal to each other. A second reproducer 2 reproduces a scene image outputted from a camera 6 that captures the plane, along a U axis and a V axis orthogonal to each other. An acceptor 3 accepts a designating manipulation of designating a first area of an X-Y coordinate system, in association with a reproducing process of the first reproducer 1. A first calculator 4 calculates a second area of a U-V coordinate system corresponding to the first area designated by the designating manipulation, by referring to a calibration parameter indicating a corresponding relationship between the X-Y coordinate system and the U-V coordinate system. A definer 5 defines the second area calculated by the first calculator 4, in association with a reproducing process of the second reproducer 2.

Thus, the reference image is reproduced along the X axis and the Y axis, while the scene image is reproduced along the U axis and the V axis, and the corresponding relationship between the X-Y coordinate system and the U-V coordinate system is indicated by the calibration parameter. When the first area of the X-Y coordinate system is designated in association with the reproducing process of the reference image, the second area of the U-V coordinate system corresponding to the designated first area is defined in association with the reproducing process of the scene image.

When the designating manipulation of the first area is accepted in association with the process of reproducing the reference image, a manipulability regarding the area setting is improved. Moreover, the second area corresponding to the designated first area is defined in association with the process of reproducing the scene image, it becomes easy to determine whether or not the area setting is adequate. Thus, a load imposed on an area setting task is reduced.

Figure 2:
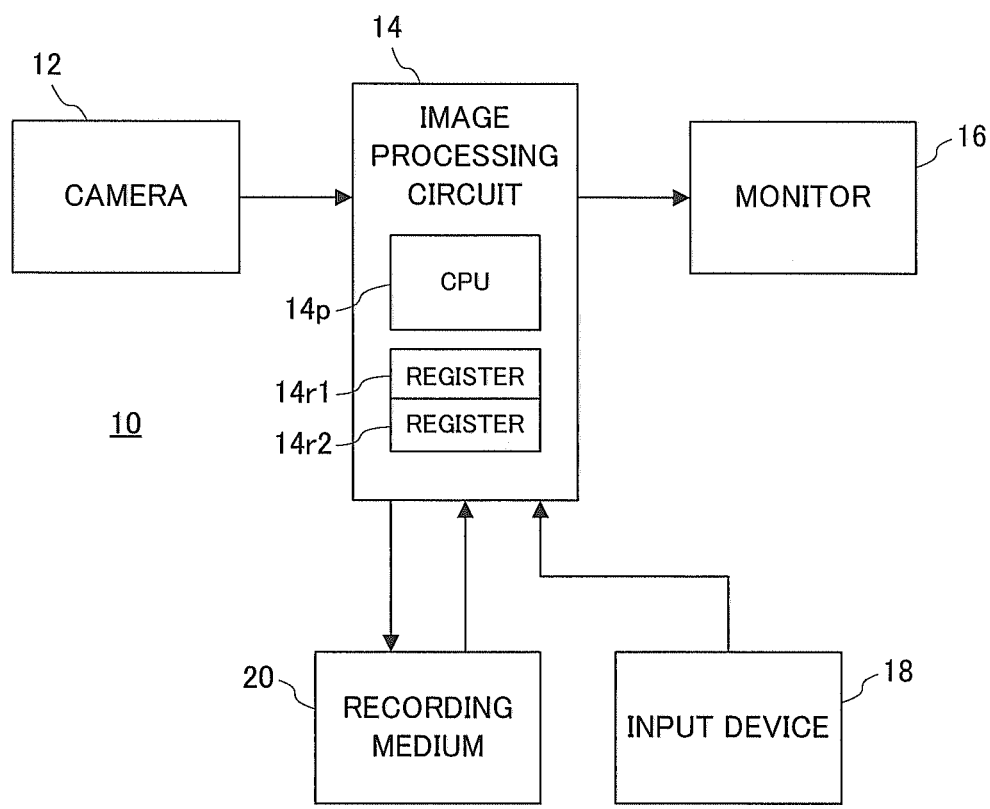
FIG. 2 is a block diagram showing a configuration of one embodiment of the present invention.

With reference to FIG. 2, a calibrating apparatus 10 according to this embodiment includes a camera 12 that repeatedly outputs image data representing a scene captured on an imaging surface. The image data outputted from the camera 12 is taken by an image processing circuit 14, and subjected to a camera-image display process by a CPU 14*p*. As a result, an image representing a scene, i.e., a camera image, is displayed on a monitor 16.

Figure 3:
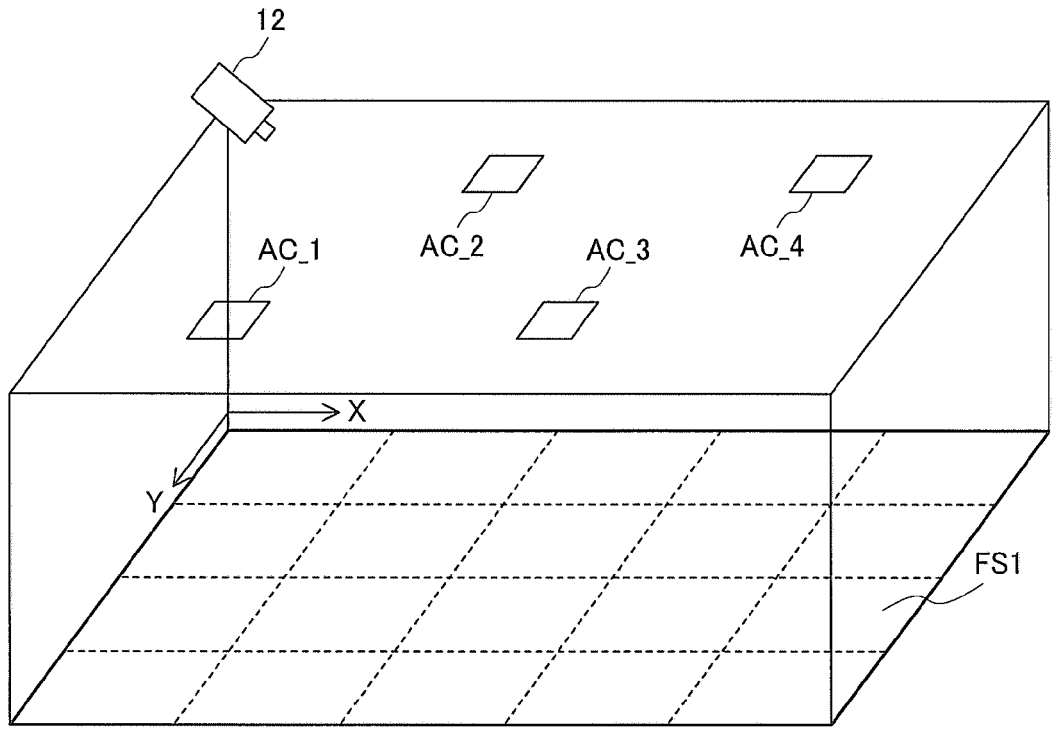
FIG. 3 is an illustrative view showing one example of an installation state of a camera applied to the embodiment in FIG. 2.
Figure 4:
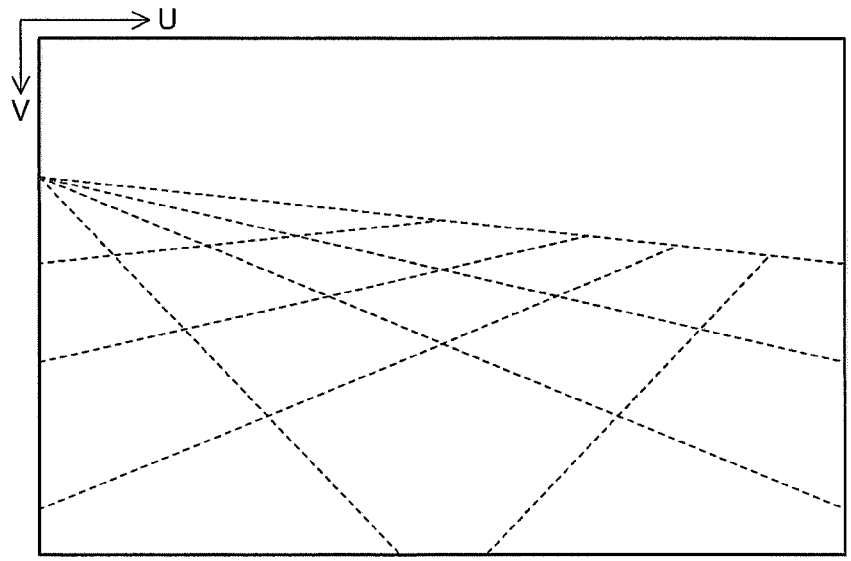
FIG. 4 is an illustrative view showing one example of a camera image displayed on a monitor of the embodiment in FIG. 2.

With reference to FIG. 3, the camera 12 is installed at an upper portion on a wall surface of a room having a plane FS1, and captures the plane FS1 from a diagonally upper position. Therefore, the camera image is displayed on a monitor screen as shown in FIG. 4. As shown in FIG. 3 and FIG. 4, the plane FS1 is defined by an X axis and a Y axis orthogonal to each other, and the camera image is reproduced along a U axis and a V axis orthogonal to each other.

On a ceiling of the room, air conditioning devices AC\_1 to AC\_4 are installed at a predetermined distance. Each of the air conditioning devices AC\_1 to AC\_4 outputs air at a designated temperature in a designated air amount. A room temperature is adjusted by the air thus outputted.

When a calibration-parameter creating mode is selected by manipulation of an input device 18 including a mouse pointer, the following process is executed by the CPU 14*p*.

Figure 5:
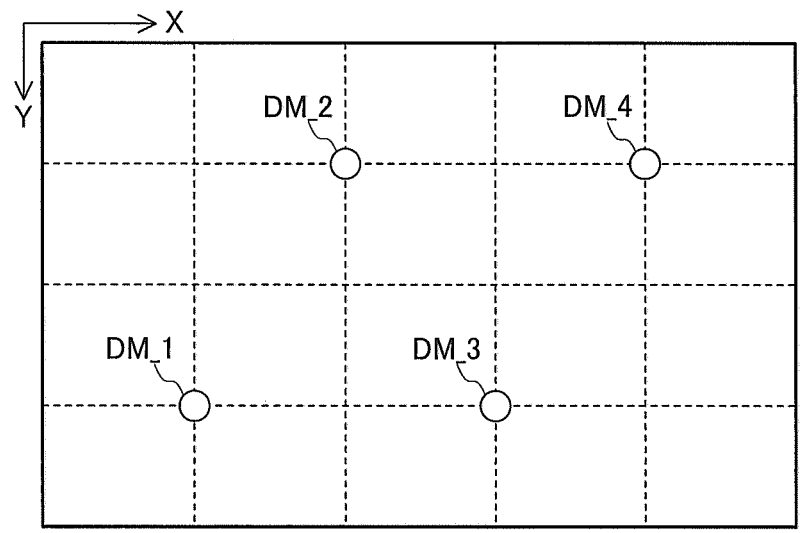
FIG. 5 is an illustrative view showing one example of a designation state of X-Y coordinates on a parameter calculation-use map image displayed on the monitor of the embodiment in FIG. 2.

Firstly, a parameter calculation-use map image is displayed on the monitor 16 as shown in FIG. 5. The map image is equivalent to an image schematically representing a state in which the plane FS1 is outlined or overlooked. Upon completion of displaying the map image, an X-Y coordinates designating manipulation of designating desired X-Y coordinates on the displayed map image is accepted from a manipulator through the input device 18.

A variable K is updated from "1" to "4" at each X-Y coordinates designating manipulation. X-Y coordinates (X\_K, Y\_K) designated by a K-th X-Y coordinates designating manipulation are set to a K-th column of a register 14*r*1 shown in FIG. 7. Furthermore, corresponding to the designated X-Y coordinates (X\_K, Y\_K), a dot DM\_K is displayed on the map image. Thus, a total of four X-Y coordinates designating manipulations are accepted. Four X-Y coordinates (X\_1, Y\_1) to (X\_4, Y\_4) are set to the register 14*r*1, and corresponding dots DM\_1 to DM\_4 are displayed on the map image as shown in FIG. 5, for example.

Upon completion of the setting process to the register 14*r*1, a U-V coordinates designating manipulation of clicking desired U-V coordinates on the camera image is accepted from the manipulator through the input device 18. A variable K is updated from "1" to "4" at each U-V coordinates designating manipulation. U-V coordinates (U\_K, V\_K) designated by a K-th U-V coordinates designating manipulation are set to a K-th column of the register 14*r*1 shown in FIG. 7. Moreover, corresponding to the designated U-V coordinates (U\_K, V\_K), the dot DC\_K is displayed on the camera image.

Figure 6:
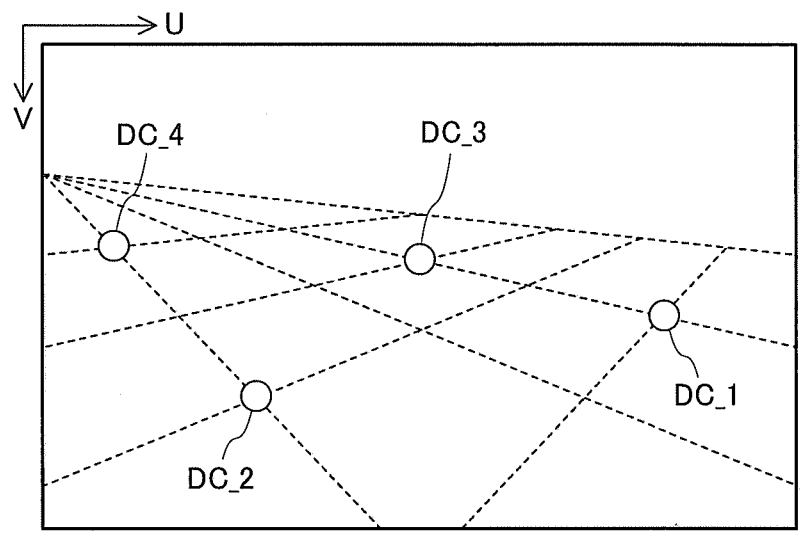
FIG. 6 is an illustrative view showing one example of a designation state of U-V coordinates on the camera image.

Thus, also a total of four U-V coordinates designating manipulations are accepted. The designated four U-V coordinates (U\_1, V\_1) to (U\_4, V\_4) are set to the register 14*r*1, and the corresponding dots DC\_1 to DC\_4 are displayed on the camera image as shown in FIG. 6, for example.

When the X-Y coordinates (X\_1, Y\_1) to (X\_4, Y\_4) and the U-V coordinates (U\_1, V\_1) to (U\_4, V\_4) are thus set to the register 14*r*1, calibration parameters P11 to P33 representing a corresponding relationship between an X-Y coordinate system and a U-V coordinate system are calculated based on a planar projective transformation matrix equation shown in Equation 1.

$$\begin{bmatrix} U \\ V \\ 1 \end{bmatrix} = \begin{bmatrix} P11 & P12 & P13 \\ P21 & P22 & P23 \\ P31 & P32 & P33 \end{bmatrix} \begin{bmatrix} X \\ Y \\ 1 \end{bmatrix} \quad \text{[Equation 1]}$$

More specifically, the mutually corresponding X-Y coordinates (X\_K, Y\_K) and U-V coordinates (U\_K, V\_K) are applied to Equation 1, and thereby, eight transformation equations (four equations for the U coordinate and four equations for the V coordinate) are produced. The calibration parameters P11 to P33 are calculated by solving simultaneous equations derived from the produced eight transformation equations.

When an air conditioning area setting mode is selected by the manipulation of the input device 18 after the completion of the calculation of the calibration parameters P11 to P33, the following process is executed by the CPU 14*p*.

Figures 8, 9:
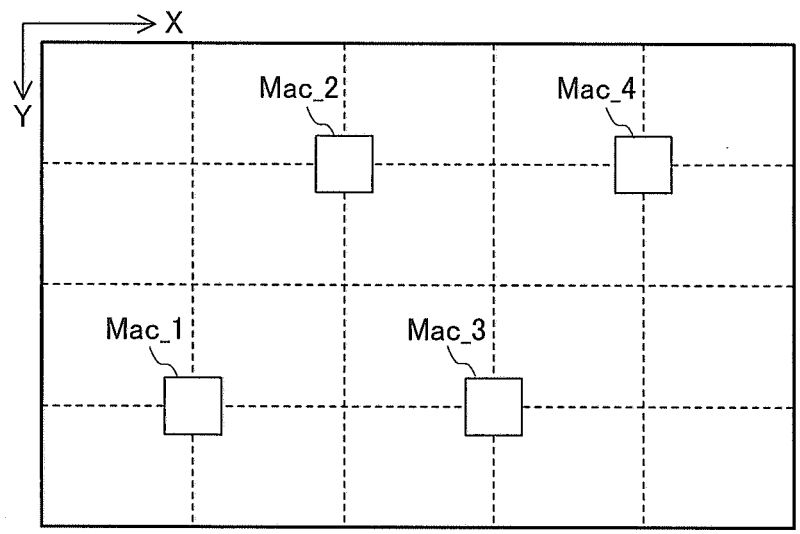
FIG. 8 is an illustrative view showing one example of an area setting-use map image displayed on the monitor of the embodiment in FIG. 2.
FIG. 9 is an illustrative view showing one example of a configuration of another register applied to the embodiment in FIG. 2.

Firstly, an area setting-use map image is displayed on the monitor 16 as shown in FIG. 8. The map image also is equivalent to the image schematically representing a state in which the plane FS1 is outlined or overlooked. Moreover, in the map image, marks Mac1 to Mac4 respectively representing the air conditioning devices AC\_1 to AC\_4 are displayed corresponding to the positions of the air conditioning devices AC\_1 to AC\_4. Upon completion of displaying the map image, the number of already-set air conditioning areas is set to the variable K. It is noted that if none of the air conditioning areas is set, a value of the variable K is set to "0".

When a rectangular area is designated on the map image by a drag manipulation of a mouse pointer, the variable K is incremented, and a line indicating the designated rectangular area is drawn on the map image.

Figure 10:
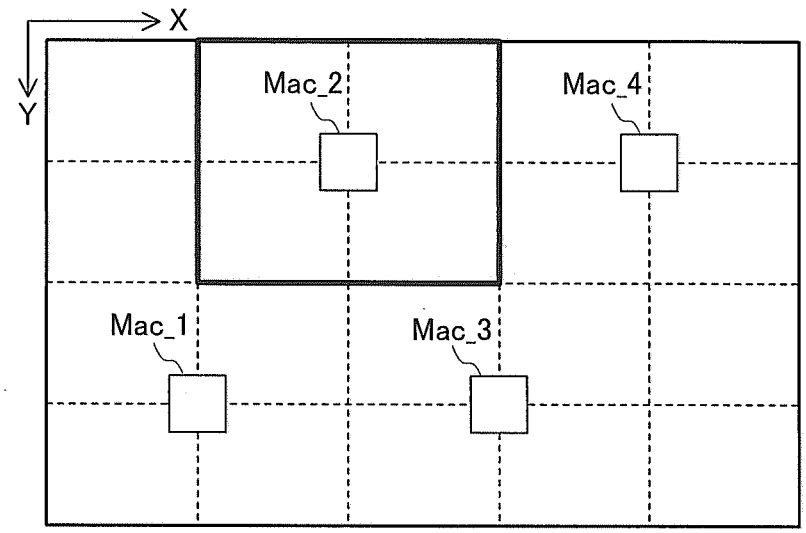
FIG. 10(A) is an illustrative view showing one example of an allocation state of an air conditioning area on the map image.
FIG. 10(B) is an illustrative view showing one example of the allocation state of the air conditioning area on the camera image.
Figure 10:
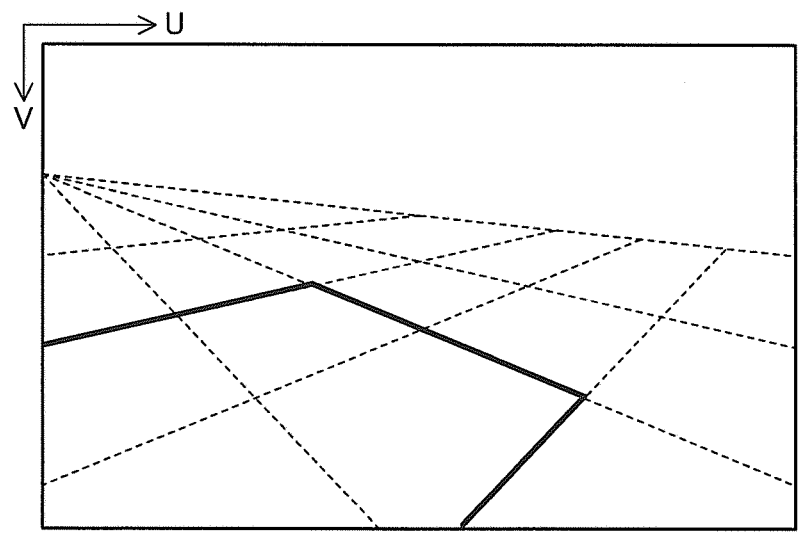
Figure 11:
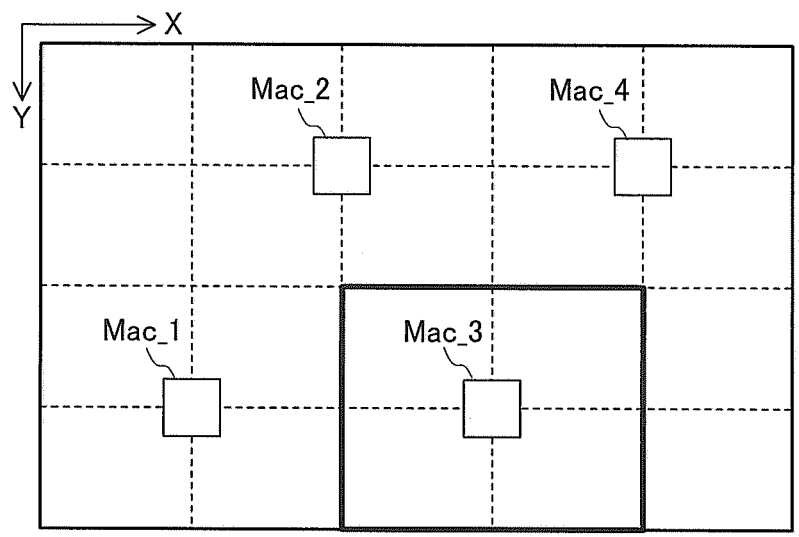
FIG. 11(A) is an illustrative view showing another example of the allocation state of the air conditioning area on the map image.
FIG. 11(B) is an illustrative view showing another example of the allocation state of the air conditioning area on the camera image.
Figure 11:
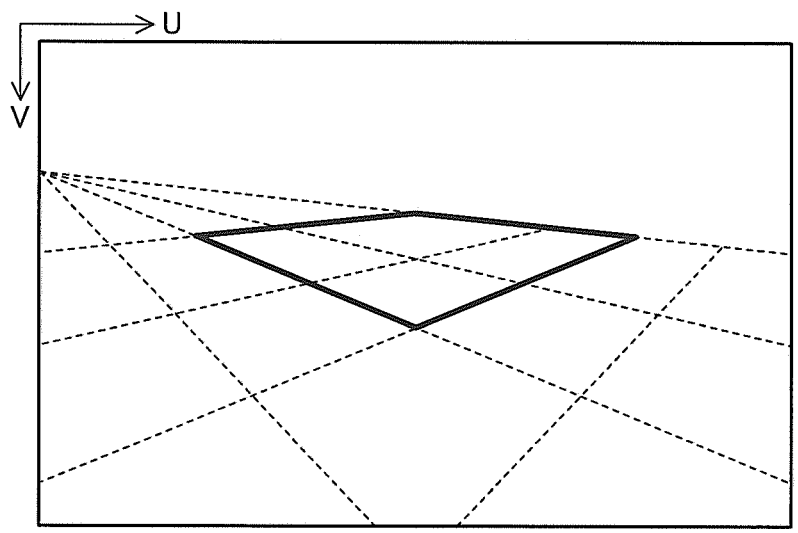

The line indicating the rectangular area is drawn as shown in FIG. 10(A) when a drag manipulation is performed to surround the mark Mac2, and drawn as shown in FIG. 11(A) when the drag manipulation is performed to surround the mark Mac3.

The four X-Y coordinates (X_1, Y_1), (X_2, Y_2), (X_3, Y_3), and (X_4, Y_4) respectively corresponding to four corners of the designated rectangular area are set to a register 14r2 shown in FIG. 9 corresponding to the value of the variable K. The X-Y coordinates (X_1, Y_1) are described in a first column that corresponds to the variable K, and the X-Y coordinates (X_2, Y_2) are described in a second column that corresponds to the variable K. Likewise, the X-Y coordinates (X_3, Y_3) are described in a third column that corresponds to the variable K, and the X-Y coordinates (X_4, Y_4) are described in a fourth column that corresponds to the variable K.

Upon completion of the process of setting to the register 14r2, the variable L is set to each of "1" to "4". X-Y coordinates (X_L, Y_L) described in an L-th column that corresponds to the variable K are transformed into U-V coordinates (U_L, V_L) according to Equation 1.

As described above, the calibration parameters P11 to P33 are equivalent to a matrix for performing a planar projective transformation between the X-Y coordinate system defining the plane FS1 and the U-V coordinate system defining the camera image. Therefore, when the X-Y coordinates (X_L, Y_L) on the plane FS1 are applied to Equation 1, the corresponding U-V coordinates (U_L, V_L) on the camera image are calculated. The U-V coordinates (U_L, V_L) thus transformed are described in the register 14r2 corresponding to the X-Y coordinates (X_L, Y_L), which are a transformation source.

A total of four transformation processes according to Equation 1 are executed, and as a result, the U-V coordinates (U_1, V_1), (U_2, V_2), (U_3, V_3), and (U_4, V_4) respectively corresponding to the X-Y coordinates (X_1, Y_1), (X_2, Y_2), (X_3, Y_3), and (X_4, Y_4) are calculated. Upon completion of the transformation process, an area surrounded by the U-V coordinates (U_1, V_1), (U_2, V_2), (U_3, V_3), and (U_4, V_4) is specified as the air conditioning area, and the line indicating the specified air conditioning area is drawn on the camera image.

Therefore, the line defining the air conditioning area is drawn as shown in FIG. 10(B) corresponding to the rectangular area shown in FIG. 10(A), and drawn as shown in FIG. 11(B) corresponding to the rectangular area shown in FIG. 11(A).

Figure 12:
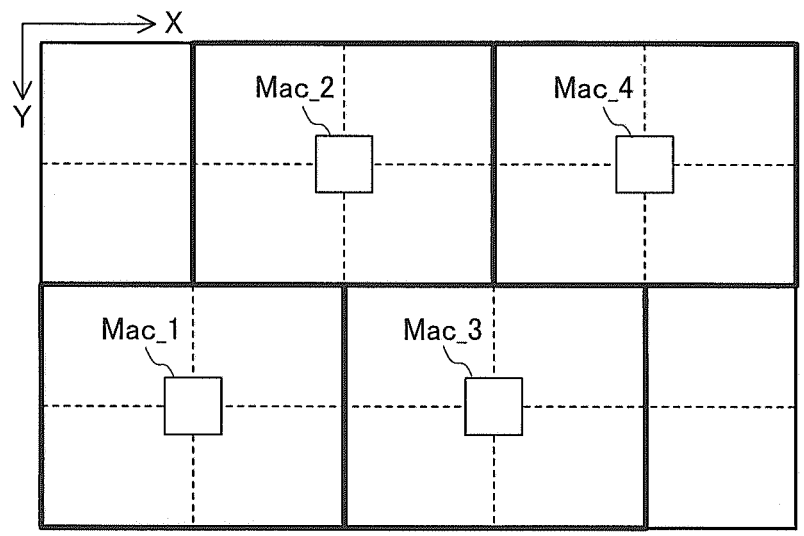
FIG. 12(A) is an illustrative view showing still another example of the allocation state of the air conditioning area on the map image.
FIG. 12(B) is an illustrative view showing still another example of the allocation state of the air conditioning area on the camera image.
Figure 12:
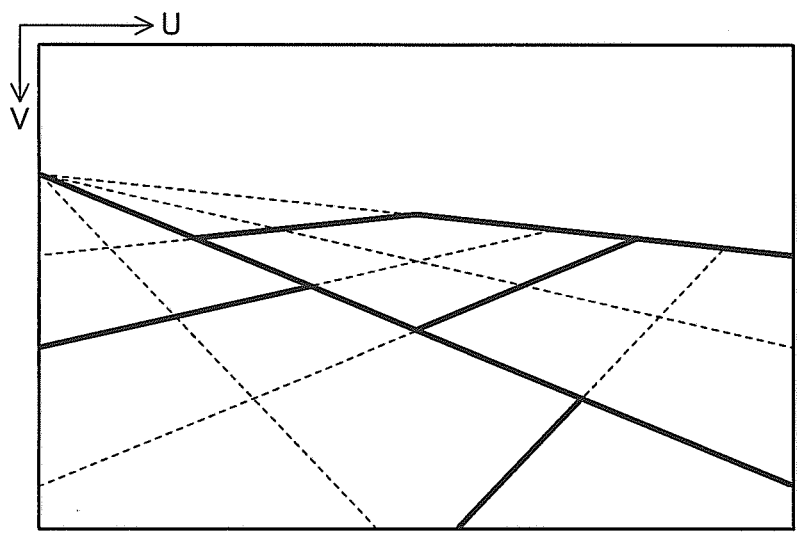

As a result, when a total of four drag manipulations are executed in a manner to surround each of the marks Mac1 to Mac4, the line indicating the rectangular area is drawn on the map image as shown in FIG. 12(A), and the line indicating the air conditioning area is drawn on the camera image as shown in FIG. 12(B). Attribute information of the four air conditioning area thus defined is described in the register 14r2.

When an air conditioning control mode is selected by the manipulation of the input device 18 after the completion of the setting of the air conditioning area, the CPU 14p adjusts outputs of air conditioning devices D_1 to D_4 by referring to a disposition of the air conditioning areas set to the register 142r and a movement of an object appearing in the camera image. Such air conditioning control is executed at each arrival of an adjustment cycle. Thereby, an adaptable air conditioning control in which the disposition of the air conditioning areas and the movement of the object are taken into consideration is realized.

Figure 13:
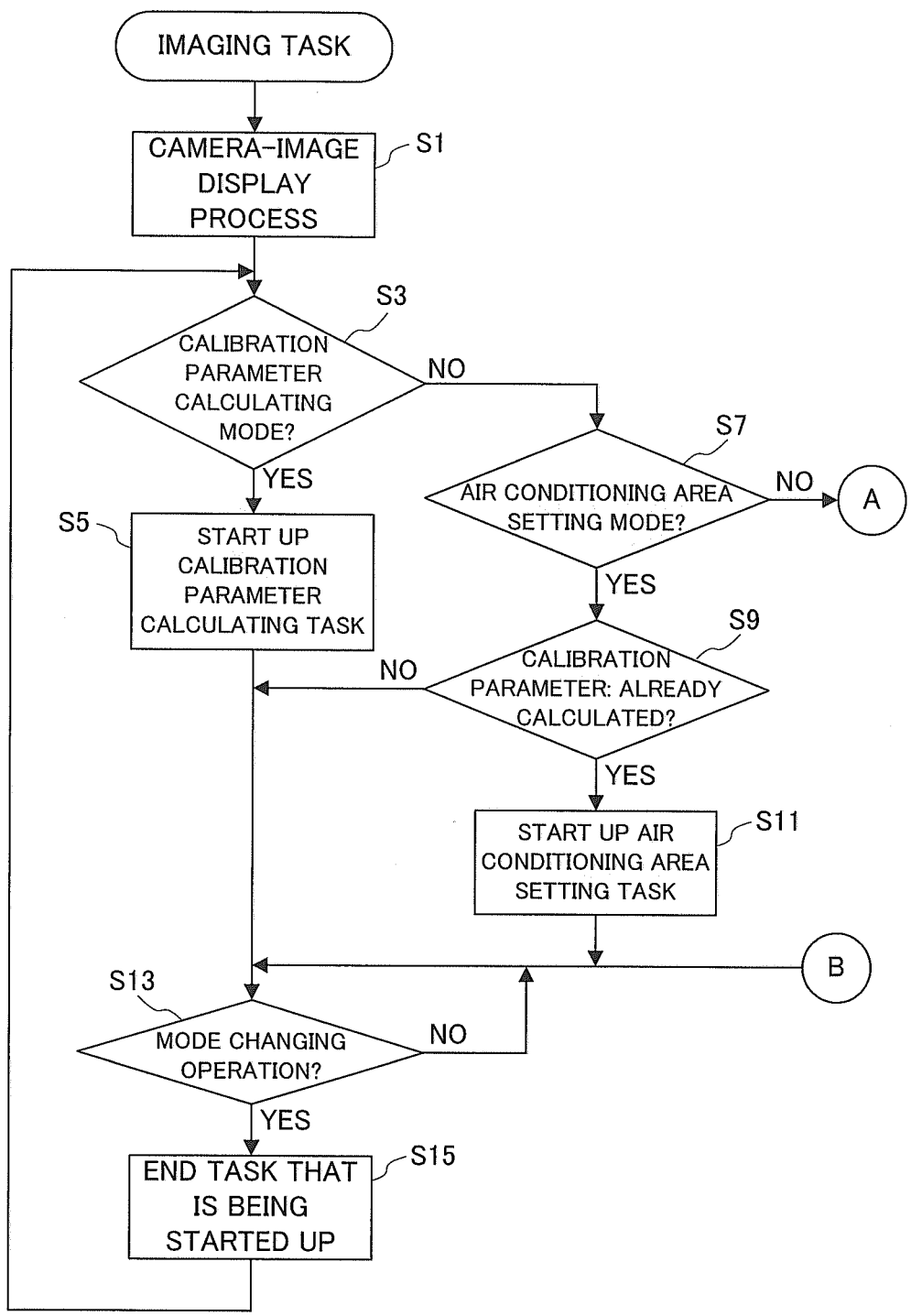
FIG. 13 is a flowchart showing one portion of behavior of a CPU applied to the embodiment in FIG. 2.
Figure 14:
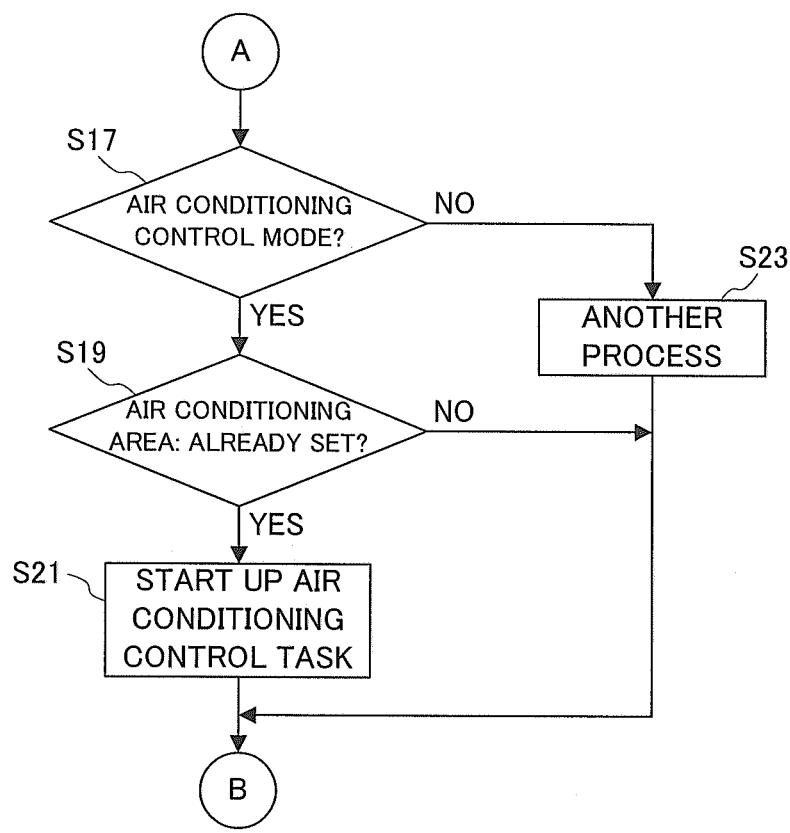
FIG. 14 is a flowchart showing another portion of the behavior of the CPU applied to the embodiment in FIG. 2.
Figure 15:
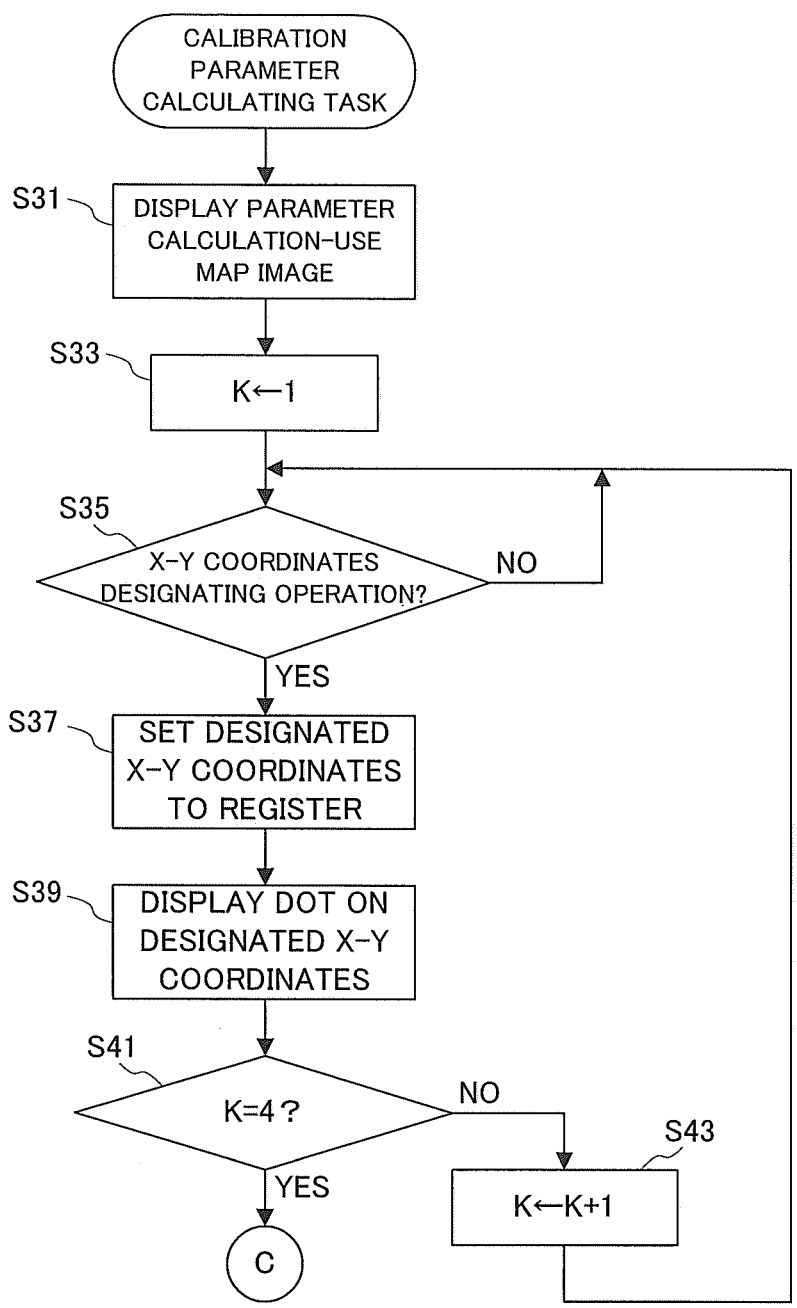
FIG. 15 is a flowchart showing still another portion of the behavior of the CPU applied to the embodiment in FIG. 2.
Figure 16:
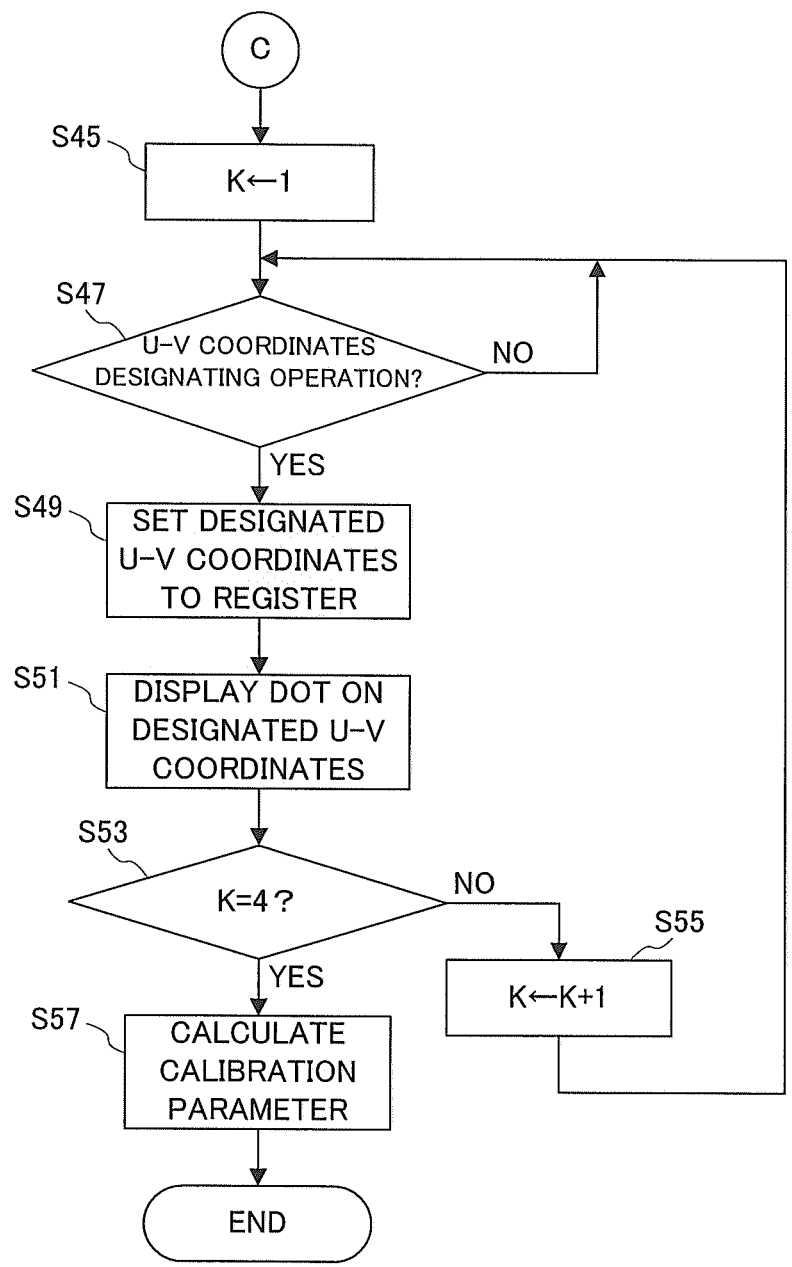
FIG. 16 is a flowchart showing yet another portion of the behavior of the CPU applied to the embodiment in FIG. 2.
Figure 17:
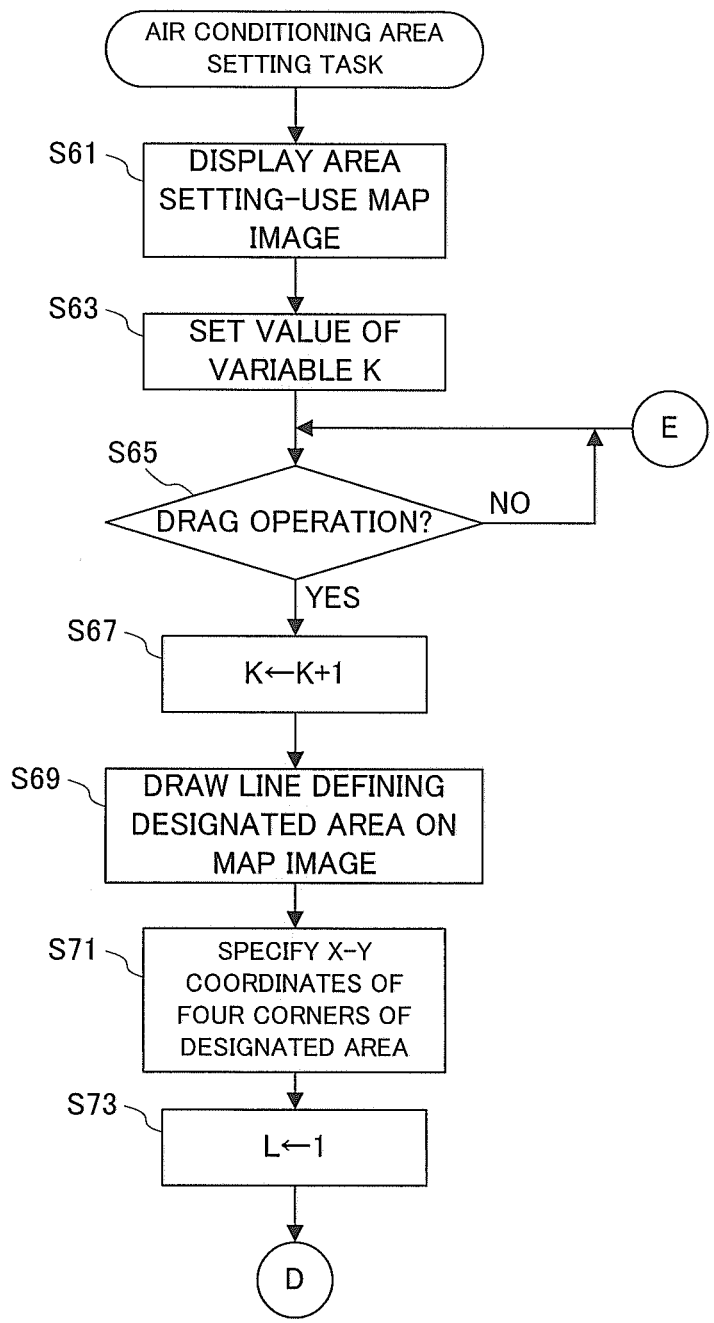
FIG. 17 is a flowchart showing another portion of the behavior of the CPU applied to the embodiment in FIG. 2.
Figure 18:
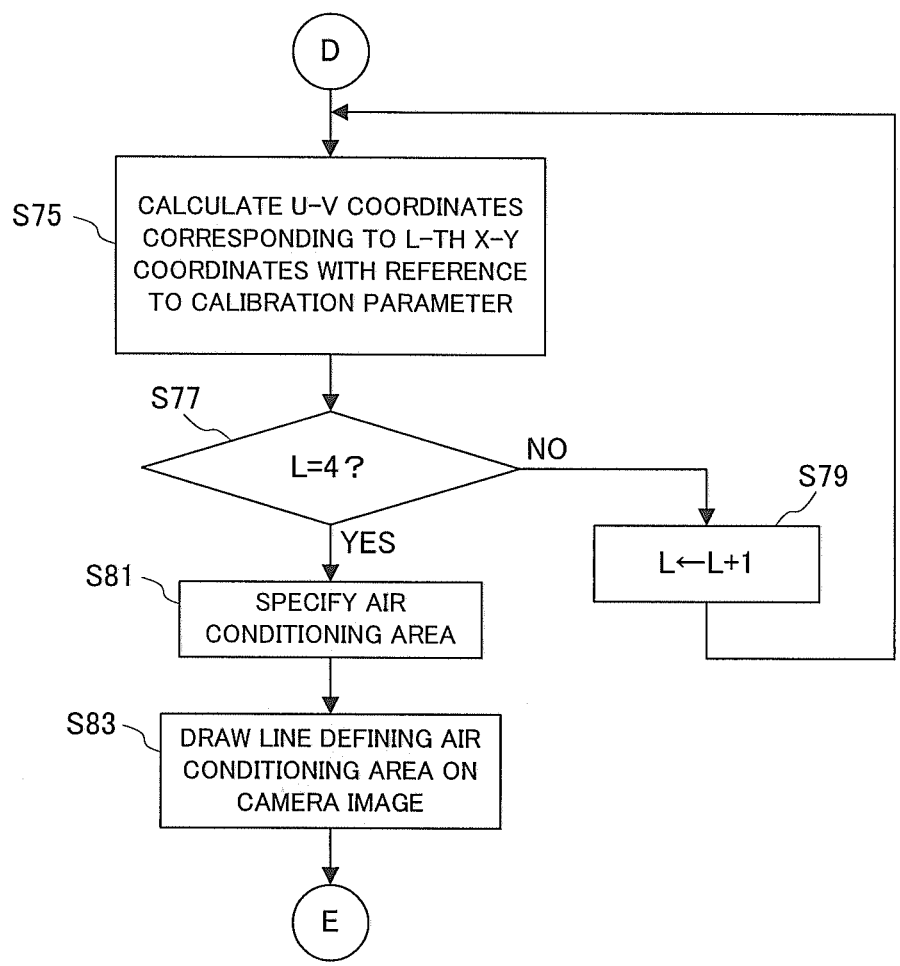
FIG. 18 is a flowchart showing still another portion of the behavior of the CPU applied to the embodiment in FIG. 2.
Figure 19:
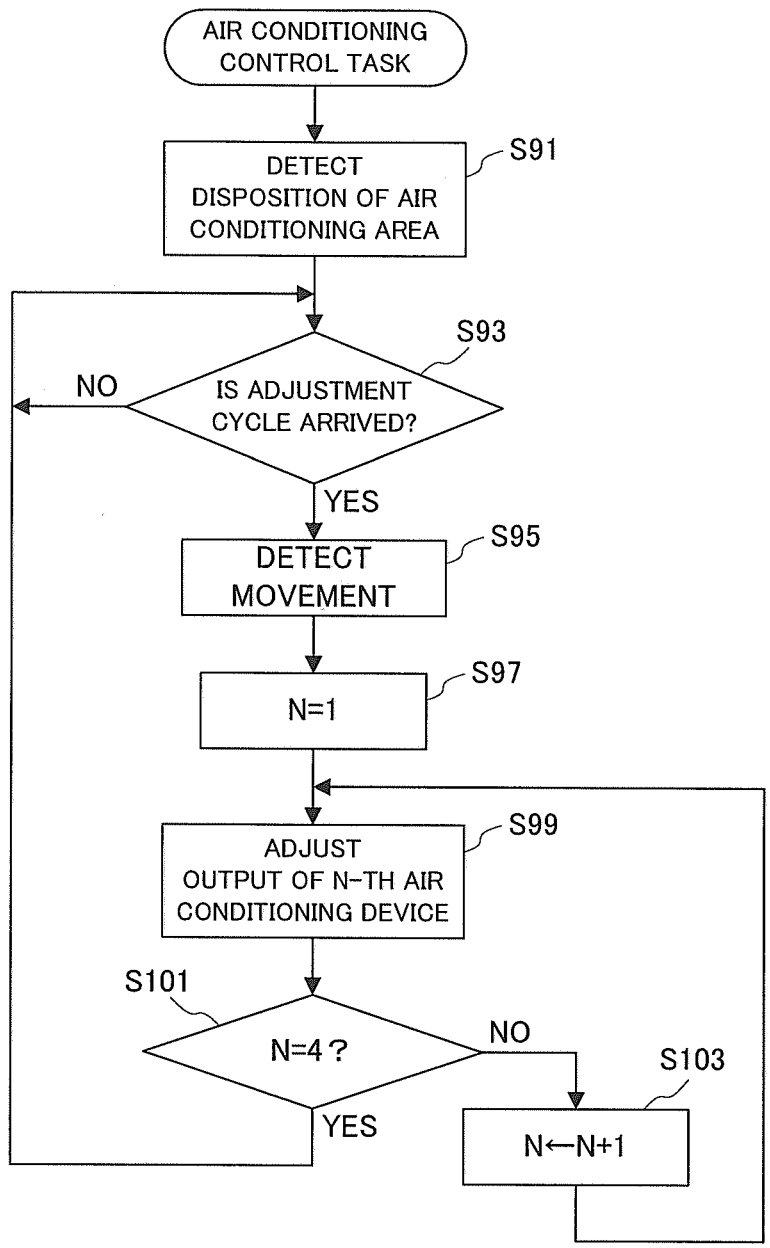
FIG. 19 is a flowchart showing yet another portion of the behavior of the CPU applied to the embodiment in FIG. 2.

The CPU 14p executes a plurality of tasks including an imaging task shown in FIG. 13 and FIG. 14, a calibration parameter calculating task shown in FIG. 15 and FIG. 16, an air conditioning area setting task shown in FIG. 17 and FIG. 18, and an air conditioning control task shown in FIG. 19. It is noted that control programs corresponding to these tasks are saved in a recording medium 20.

With reference to FIG. 13 and FIG. 14, a camera-image display process is executed in a step S1. As a result, the camera image is displayed on the monitor 16. It is determined in a step S3 whether or not an operation mode at a current time point is the calibration parameter calculating mode, it is determined in a step S7 whether or not the operation mode at a current time point is the air conditioning area setting mode, and it is determined in a step S17 whether or not the operation mode at a current time point is the air conditioning control mode.

When YES is determined in the step S3, the calibration parameter calculating task is started in a step S5, and thereafter, the process advances to a step S13. When YES is determined in the step S7, it is determined in a step S9 whether or not the calibration parameter is already calculated. When a determined result is YES, the process advances to the step S13 after starting the air conditioning area setting task in a step S11, and when the determined result is NO, the process directly advances to the step S13.

When YES is determined in the step S17, it is determined in a step S19 whether or not the air conditioning area is already set. When a determined result is YES, the process advances to the step S13 after starting the air conditioning control task in a step S21, and when the determined result is NO, the process directly advances to the step S13. When NO is determined in all of the steps S3, S7, and S17, the process advances to the step S13 after executing another process in a step S23.

In the step S13, it is repeatedly determined whether or not a mode changing manipulation is performed. When a determined result is updated from NO to YES, the task that is being started is ended in a step S15. Thereafter, the process returns to the step S3.

With reference to FIG. 15 and FIG. 16, the parameter calculation-use map image is displayed on the monitor 16 in a step S31, and the variable K is set to "1" in a step S33. In a step S35, it is determined whether or not the X-Y coordinates designating manipulation is performed. When a determined result is updated from NO to YES, the process advances to a step S37 so as to set the X-Y coordinates (X_K, Y_K) designated by the X-Y coordinates designating manipulation to the K-th column of the register 14r1. In a step S39, corresponding to the designated X-Y coordinates (X_K, Y_K), a marker DM_K is displayed on the map image.

In a step S41, it is determined whether or not the variable K reaches "4", and when a determined result is NO, the process returns to the step S35 after incrementing the variable K in a step S43 while when the determined result is YES, the process advances to a step S45.

In the step S45, the variable K is set to "1", and it is repeatedly determined in a step S47 whether or not the U-V coordinates designating manipulation is performed. When a determined result is updated from NO to YES, the process advances to a step S49 so as to set the designated U-V coordinates (U_K, V_K) to the K-th column of the register 14r1. In a step S51, corresponding to the designated U-V coordinates (U_K, V_K), the marker DC_K is displayed on the camera image. In a step S53, it is determined whether or not the variable K reaches "4". When a determined result is NO, the variable K is incremented in a step S55, and then, the process returns to the step S47 while the determined result is YES, the process advances to a step S57.

In the step S57, the X-Y coordinates (X_1, Y_1) to (X_4, Y_4) and the U-V coordinates (U_1, V_1) to (U_4, V_4) set to the register 14r1 are applied to the above-described Equation 1 so as to calculate the calibration parameters P11 to P33. Upon completion of the process in the step S57, the calibration parameter calculating task is ended.

With reference to FIG. 17 and FIG. 18, the area setting-use map image is displayed on the monitor 16 in a step S61, and the value of the variable K is set in a step S63. If none of the air conditioning areas is set, then the value of the variable K is set to "0". On the other hand, if one or at least two air conditioning areas are already set, then the value of the variable K is set to the number of the set air conditioning areas.

In a step S65, it is determined whether or not the drag manipulation for the area designation is performed, and when a determined result is updated from NO to YES, the variable K is incremented in a step S67. In a step S69, the line defining the rectangular area designated by the drag manipulation is drawn on the map image.

In a step S71, the four X-Y coordinates (X_1, Y_1), (X_2, Y_2), (X_3, Y_3), and (X_4, Y_4) respectively corresponding to the four corners of the rectangular area thus designated are specified. The specified X-Y coordinates (X_1, Y_1), (X_2, Y_2), (X_3, Y_3), and (X_4, Y_4) are set to the register 14r2, corresponding to the value of the variable K.

Upon completion of the process of setting to the register 14r2, the variable L is set to "1" in a step S73. In a subsequent step S75, the X-Y coordinates (X_L, Y_L) described in the L-th column corresponding to the variable K are read out from the register 14r2, and the read-out X-Y coordinates (X_L, Y_L) are transformed into the U-V coordinates (U_L, V_L) according to Equation 1. The transformed U-V coordinates (U_L, V_L) are described in the register 14r2 corresponding to the X-Y coordinates (X_L, Y_L), which are a transformation source.

In a step S77, it is determined whether or not the variable L reaches "4". When a determined result is NO, the variable L is incremented in a step S79, and then, the process returns to the step S75. When the determined result is YES, the process advances to a step S81. Therefore, processes after the step S81 are executed after the X-Y coordinates (X_1, Y_1), (X_2, Y_2), (X_3, Y_3), and (X_4, Y_4) are transformed into the U-V coordinates (U_1, V_1), (U_2, V_2), (U_3, V_3), and (U_4, V_4).

In the step S81, the area surrounded by the U-V coordinates (U_1, V_1), (U_2, V_2), (U_3, V_3), and (U_4, V_4) that correspond to the variable K is specified as the air conditioning area. In a step S83, the line defining the specified air conditioning area is drawn on the camera image. When the line is drawn, the process returns, to the step S65, regarding that the setting for the K-th air conditioning area is completed.

With reference to FIG. 19, the disposition of the air conditioning areas set to the register 142r is detected in a step S91, and it is determined in a step S93 whether or not the adjustment cycle is arrived. When a determined result is updated from NO to YES, the process advances to a step S95 so as to detect the movement of the object based on the camera image. In a step S97, the variable N is set to "1", and in a step S99, the output of the air conditioning device AC_N is adjusted by referring to the disposition detected in the step S91 and the movement detected in the step S95. In a step S101, it is determined whether or not the variable N reaches "4". When a determined result is NO, the process returns to the step S99 after incrementing the variable N in a step S103 while when the determined result is YES, the process directly returns to the step S93.

As can be seen from the above-described explanation, the CPU 14p displays on the monitor 16 the map image representing the state in which the plane FS1 is outlined or overlooked along the X axis and the Y axis orthogonal to each other (S61), and displays on the monitor 16 the camera image outputted from the camera 12 that captures the plane FS1 from an upper diagonal position along the U axis and the V axis orthogonal each other (S1). Moreover, the CPU 14p accepts the drag manipulation of designating the rectangular area of the X-Y coordinate system on the area setting-use map image displayed on the monitor 16 (S65), calculates the air conditioning area of the U-V coordinate system that corresponds to the designated rectangular area by referring to the calibration parameter indicating the corresponding relationship between the X-Y coordinate system and the U-V coordinate system (S67 to S81), and defines the calculated air conditioning area on the camera image displayed on the monitor 16 (S83).

Thus, the map image is displayed along the X axis and the Y axis while the camera image is displayed along the U axis and the V axis, and the corresponding relationship between the X-Y coordinate system and the U-V coordinate system is shown by the calibration parameter. When the rectangular area of the X-Y coordinate system is designated in association with the process of displaying the map image, the air conditioning area of the U-V coordinate system that corresponds to the designated rectangular area is defined on the camera image.

By accepting the drag manipulation on the map image, the manipulability regarding the area setting is improved. Moreover, by defining the air conditioning area corresponding to the rectangular area on the camera image, it becomes easier to determine whether or not the area setting is appropriate. Thus, a load imposed on an area setting task is reduced.

It is noted that in this embodiment, the rectangular area is designated by the drag manipulation of the mouse pointer. However, instead thereof, the rectangular area may be designated by a manipulation of clicking the mouse pointer or direct input of a numerical value indicating the U-V coordinates. In this case, the rectangular area is formed by linking the proximal U-V coordinates by straight lines.

Moreover, in this embodiment, the area defined on the map image is rectangular, and the position of and the expansion of the rectangular area are set according to the drag manipulation. However, the shape, the position, and the expansion of the area defined on the map image may also be set in consideration of the positions and an output capability of the air conditioning devices AC_1 to AC_4.

In this case, the following process may be adopted: when the click manipulation is accepted on the map image, the air conditioning device influencing the coordinates designated by the click manipulation is specified by a weighting calculation in which the distance from the designated coordinates to the air conditioning devices AC_1 to AC_4 and the output capability of the air conditioning devices AC_1 to AC_4 are referenced, and the area having the shape and the expansion corresponding to the output capability of the specified air conditioning device is set to a position where the specified air conditioning device is centered.

Moreover, in this embodiment, the plane FS1 is captured from a diagonally upper position by the camera 12 installed at the upper portion on the wall surface, however, instead thereof, the plane FS1 may be captured from directly above by an omnidirectional camera set on a ceiling.

Furthermore, in this embodiment, the calibration parameter is calculated based on the four U-V coordinates and the four X-Y coordinates, however, the number of coordinates to be referred to in order to calculate the calibration parameter may be "5" or more.

Moreover, in this embodiment, it is assumed that the output of the air conditioning device is adaptively controlled, however, instead of the output of the air conditioning device, or together with the output of the air conditioning device, the output of an illuminating device (i.e., brightness) may be adaptively controlled.

Moreover, in this embodiment, it is assumed that the planar projective transformation is performed between the X-Y coordinate system defining the plane FS1 and the U-V coordinate system defining the camera image. However, in an office where a large number of desks and chairs are placed, it appears that accurate air conditioning control in which distribution of people is taken into consideration can be realized if a movement of an arm on the desk, rather than a floor surface, is noticed.

Figure 20:
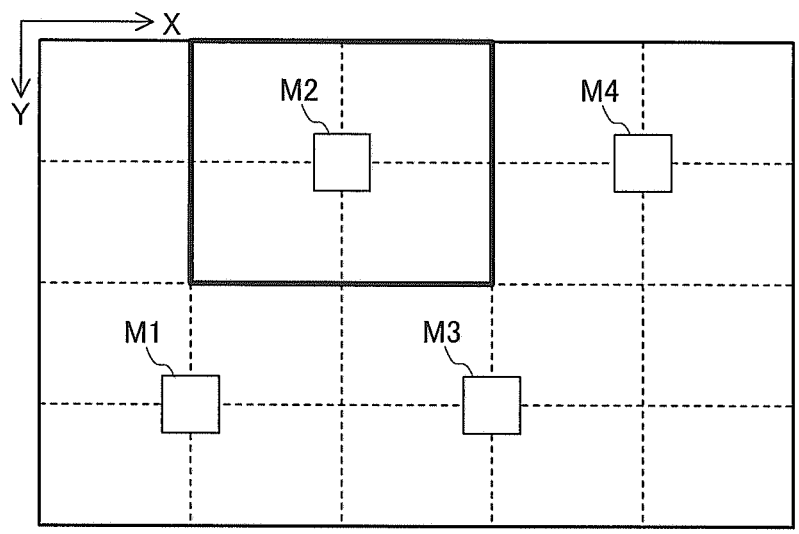
FIG. 20(A) is an illustrative view showing one example of the allocation state of the air conditioning area on the map image in another embodiment.
FIG. 20(B) is an illustrative view showing one example of the allocation state of the air conditioning area on the camera image in the other embodiment.
Figure 20:
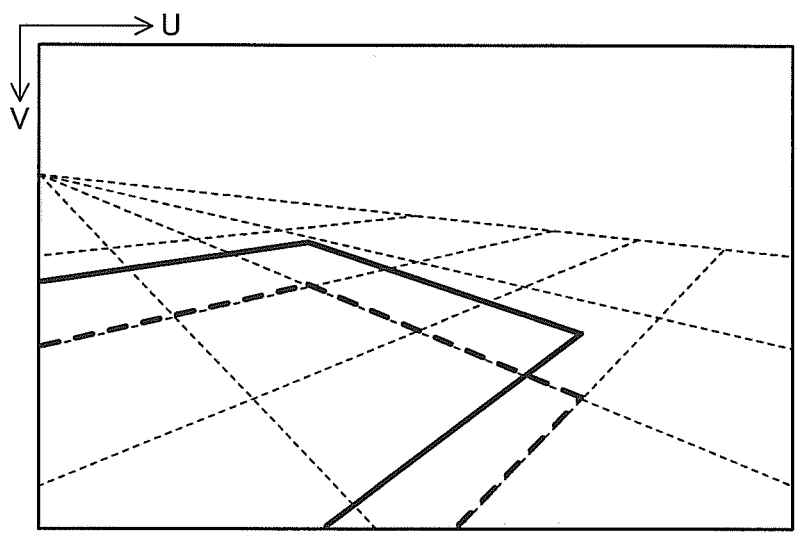

In this case, the calibration parameters P11 to P33 applied to Equation 1 are adjusted to values in which an offset equivalent to a height of the desk (an offset in a length direction of a Z axis orthogonal to an X axis and a Y axis) is taken into consideration. If the planar projective transformation is executed by referring to the calibration parameters P11 to P33 having the thus adjusted values, then a measurement area corresponding to a rectangular area indicated by a bold line in FIG. 20(A) is set as indicated by a bold line in FIG. 20(B) (a dotted line indicates a previous setting).

Figure 21:
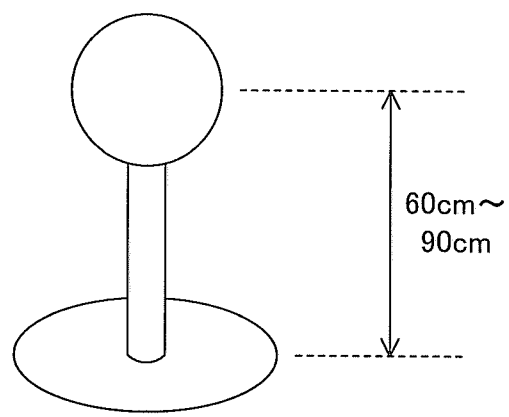
FIG. 21 is a perspective view showing one example of a pole used for calculating a calibration parameter in the other embodiment.

Furthermore, when calculating such a calibration parameter, it is preferable that a pole capable of adjusting a height, as shown in FIG. 21, be placed on a floor surface, and desired U-V coordinates be designated by clicking the pole appearing in a camera image.

A position of X-Y coordinates of each air conditioner is previously registered as a default value, a task of designating the U-V coordinates is performed by sequentially placing an index (marker) such as the pole, etc., at each position, and then, the calibration parameter is calculated. In this way, the task of designating the X-Y coordinates in the process of calculating the calibration parameter becomes unnecessary.

That is, the air conditioner is fixed, and thus, the position at which the index is placed is directly below the air conditioner and is easy to determine. As a result, it is possible to reduce a burden of a task of designating the position of the X-Y coordinates obtained when the calibration parameter is calculated at each calibration and the position of the U-V coordinates corresponding thereto.

Then, when it is difficult to install the index directly below the air conditioner because of the presence of a desk, a cabinet, etc., installation of a position of the index by deviating the position after installing the position of the index by deviating the position is inputted, designation of the X-Y coordinates is manipulated, and designation of the U-V coordinates on the camera image is manipulated. Then, from a corresponding relationship between the X-Y coordinates and the U-V coordinates, the calibration parameter is calculated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A calibrating apparatus, comprising:
a first reproducer which reproduces a reference image representing a state in which a plane is overlooked, along an X axis and a Y axis orthogonal to each other;
a second reproducer which reproduces a scene image outputted from a camera that captures the plane, along a U axis and a V axis orthogonal to each other;
an acceptor which accepts a designating manipulation of designating a first area of an X-Y coordinate system, in association with a reproducing process of said first reproducer;
a first calculator which calculates a second area of a U-V coordinate system corresponding to the first area designated by the designating manipulation by referring to a calibration parameter indicating a corresponding relationship between the X-Y coordinate system and the U-V coordinate system; and
a definer which defines the second area calculated by the first calculator, in association with a reproducing process of said second reproducer.

2. A calibrating apparatus according to claim 1, wherein the designating manipulation is equivalent to a manipulation of defining the first area on the reference image reproduced by said first reproducer, and said definer defines the second area on the scene image reproduced by said second reproducer.

3. A calibrating apparatus according to claim 1, wherein said first calculator includes a coordinate specifier which specifies reference coordinates of the first area, and a coordinates transformer which transforms the reference coordinates specified by said coordinate specifier into reference coordinates of the second area.

4. A calibrating apparatus according to claim 1, wherein the designating manipulation is equivalent to a manipulation of designating the first area, corresponding to each of one or at least two devices arranged in a space partitioned by the plane.

5. A calibrating apparatus according to claim 4, wherein each of the one or at least two devices is equivalent to an air conditioning device, said calibrating apparatus further comprising a controller which executes air conditioning control by referring to a disposition of the second area calculated by said first calculator.

6. A calibrating apparatus according to claim 1, further comprising:
a first acceptor which accepts a first designating manipulation of designating a plurality of X-Y coordinates on an image representing the plane reproduced along the X axis and the Y axis;
a second acceptor which accepts a second designating manipulation of designating a plurality of U-V coordinates on a scene image reproduced by said second reproducer; and
a calculator which calculates the calibration parameter based on the plurality of X-Y coordinates designated by the first designating manipulation and the plurality of U-V coordinates designated by the second designating manipulation.

7. A calibrating apparatus according to claim 4, further comprising:
a first acceptor which accepts a first designating manipulation of designating a plurality of X-Y coordinates on an image representing the plane reproduced along the X axis and the Y axis;
a second acceptor which accepts a second designating manipulation of designating a plurality of U-V coordinates on a scene image reproduced by said second reproducer; and
a calculator which calculates the calibration parameter based on X-Y coordinates at positions of the one or at least two devices, one or at least two X-Y coordinates designated by the first designating manipulation, and the plurality of U-V coordinates designated by the second designating manipulation.

8. A calibrating apparatus according to claim 4, further comprising:
- a second acceptor which accepts a second designating manipulation of designating a plurality of U-V coordinates on a scene image reproduced by said second reproducer; and
- a calculator which calculates the calibration parameter based on X-Y coordinates at positions of a plurality of devices and a plurality of U-V coordinates designated by the second designating manipulation.

* * * * *